(12) United States Patent
Aoki

(10) Patent No.: US 11,763,519 B2
(45) Date of Patent: Sep. 19, 2023

(54) ALPHA VALUE DETERMINATION APPARATUS, ALPHA VALUE DETERMINATION METHOD, PROGRAM, AND DATA STRUCTURE OF IMAGE DATA

(71) Applicant: Sony Interactive Entertainment Inc., Tokyo (JP)

(72) Inventor: Sachiyo Aoki, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 0 days.

(21) Appl. No.: 17/263,036

(22) PCT Filed: Aug. 1, 2019

(86) PCT No.: PCT/JP2019/030308
§ 371 (c)(1),
(2) Date: Jan. 25, 2021

(87) PCT Pub. No.: WO2020/031859
PCT Pub. Date: Feb. 13, 2020

(65) Prior Publication Data
US 2021/0312703 A1    Oct. 7, 2021

(30) Foreign Application Priority Data

Aug. 6, 2018    (JP) .................. 2018-147633

(51) Int. Cl.
*G06T 15/50*    (2011.01)
*G06T 11/00*    (2006.01)
*G09G 5/377*    (2006.01)

(52) U.S. Cl.
CPC .......... *G06T 15/503* (2013.01); *G06T 11/001* (2013.01); *G09G 5/377* (2013.01); *G09G 2340/10* (2013.01)

(58) Field of Classification Search
None
See application file for complete search history.

(56) References Cited

U.S. PATENT DOCUMENTS 7,720,312 B2    5/2010  Maier
2002/0089515 A1*    7/2002  Yamamoto .............. G06T 15/10
345/611

(Continued)

FOREIGN PATENT DOCUMENTS

EP    1521458 A1    4/2005
EP    1566773 A1    8/2005

(Continued)

OTHER PUBLICATIONS

International Preliminary Report on Patentability and Written Opinion for corresponding PCT Application No. PCT/JP2019/030308, 13 pages, dated Feb. 18, 2021.

(Continued)

*Primary Examiner* — Sarah Le
(74) *Attorney, Agent, or Firm* — Matthew B. Dernier, Esq.

(57) ABSTRACT

Provided are an alpha value determination apparatus, an alpha value determination method, a program, and a data structure of image data that can represent an image rich in both color and transparency while suppressing the storage capacity necessary for storing the image data. A pixel data storage unit stores a plurality of pieces of pixel data indicating a pixel value and an index and associated individually with a plurality of pixels included in an image. An alpha value data storage unit stores alpha value data that is referenced in common by the index indicated in the plurality of pieces of pixel data and that indicates correspondence between the index and an alpha value. A combined image generation unit determines alpha values of a plurality of (Continued)

pixels associated with the respective pieces of pixel data based on the index indicated in the pixel data and the alpha value data.

14 Claims, 9 Drawing Sheets

(56) References Cited

U.S. PATENT DOCUMENTS

| | | | | |
|---|---|---|---|---|
| 2004/0119725 | A1* | 6/2004 | Li | G06T 11/60 |
| | | | | 345/629 |
| 2005/0110803 | A1 | 5/2005 | Sugimura | |
| 2005/0213853 | A1 | 9/2005 | Maier | |
| 2005/0243101 | A1* | 11/2005 | Sasaki | G06T 11/001 |
| | | | | 345/603 |
| 2006/0183089 | A1* | 8/2006 | Gleissner | G11B 27/10 |
| | | | | 434/157 |
| 2006/0284976 | A1* | 12/2006 | Girgensohn | G06F 16/786 |
| | | | | 348/135 |
| 2011/0116763 | A1* | 5/2011 | Muikaichi | H04N 9/8244 |
| | | | | 386/245 |
| 2013/0162911 | A1* | 6/2013 | Glen | H04N 21/234327 |
| | | | | 348/586 |
| 2014/0366057 | A1* | 12/2014 | Brockmann | H04N 21/4821 |
| | | | | 725/37 |
| 2015/0145879 | A1* | 5/2015 | Nakayama | H04N 19/428 |
| | | | | 345/555 |
| 2017/0116966 | A1* | 4/2017 | Brabender | H04N 19/423 |
| 2018/0308269 | A1* | 10/2018 | Baran | G06T 5/009 |

FOREIGN PATENT DOCUMENTS

| | | |
|---|---|---|
| JP | 2005107780 A | 4/2005 |
| JP | 2005251193 A | 9/2005 |

OTHER PUBLICATIONS

International Search Report for corresponding PCT Application No. PCT/JP2019/030308, 4 page, dated Oct. 29, 2019.
Extended European Search Report for corresponding EP Application No. 19847480.1, 9 pages, dated Apr. 5, 2022.

* cited by examiner

| FIRST R ALPHA VALUE (8) |
| SECOND R ALPHA VALUE (8) |
| THIRD R ALPHA VALUE (8) |
| FOURTH R ALPHA VALUE (8) |
| FIRST G ALPHA VALUE (8) |
| SECOND G ALPHA VALUE (8) |
| THIRD G ALPHA VALUE (8) |
| FOURTH G ALPHA VALUE (8) |
| FIRST B ALPHA VALUE (8) |
| SECOND B ALPHA VALUE (8) |
| THIRD B ALPHA VALUE (8) |
| FOURTH B ALPHA VALUE (8) |

ALPHA VALUE DETERMINATION APPARATUS, ALPHA VALUE DETERMINATION METHOD, PROGRAM, AND DATA STRUCTURE OF IMAGE DATA

TECHNICAL FIELD

The present invention relates to an alpha value determination apparatus, an alpha value determination method, a program, and a data structure of image data.

BACKGROUND ART

There is a known format of image data, in which the color depth of each of three components such as RGB (Red, Green, Blue) and HLS (Hue, Saturation, Luminance) is represented by 8 bits, and an alpha value indicating the transparency is represented by 8 bits to thereby represent the color and the transparency of one pixel by 32 bits in total.

In addition, a format of image data such as deep color and HDR (High Dynamic Range) has emerged in recent years, in which the color depth of each component can be represented by 10 bits to thereby perform rich image representation.

SUMMARY

Technical Problem

In general, addresses are assigned in 32 bits to a memory. Therefore, in a case where the color depth is represented by 10 bits for each of three components, and the alpha value is represented by 8 bits to thereby represent the color and the transparency of one pixel by 38 bits in total, 64 bits need to be allocated to one pixel. In this case, the storage capacity necessary for storing the image data is approximately twice as much as the case in which 32 bits are allocated to one pixel. Furthermore, the time necessary for memory access becomes long in this case.

Here, although the alpha value can be represented by 2 bits, semi-transparency other than opaqueness and complete transparency can be substantially represented in only two stages in that case, and the representation of transparency is limited. Furthermore, in a case where the color depth of each component is represented by 9 bits and the alpha value is represented by 5 bits, the representation of color and transparency is also limited.

The present invention has been made in view of the circumstances, and an object of the present invention is to provide an alpha value determination apparatus, an alpha value determination method, a program, and a data structure of image data that can represent an image rich in both color and transparency while suppressing the storage capacity necessary for storing the image data.

Solution to Problem

To solve the problem, the present invention provides an alpha value determination apparatus including a pixel data storage unit that stores a plurality of pieces of pixel data indicating a pixel value and an index and associated individually with a plurality of pixels included in an image, an alpha value data storage unit that stores alpha value data that is referenced in common by the index indicated in the plurality of pieces of pixel data and that indicates correspondence between the index and an alpha value, and an alpha value determination unit that determines alpha values of a plurality of pixels associated with the respective pieces of pixel data based on the index indicated in the pixel data and the alpha value data.

In an aspect of the present invention, the number of bits of the index indicated in the pixel data is smaller than the number of bits of the pixel value of one component indicated in the pixel data.

Furthermore, in an aspect of the present invention, the alpha value data storage unit stores the alpha value data indicating correspondence between the index and a plurality of alpha values associated individually with a plurality of components of a pixel, and the alpha value determination unit determines an alpha value of each of the plurality of components of the pixel associated with the pixel data based on the index indicated in the pixel data and the alpha value data.

Furthermore, in an aspect of the present invention, the alpha value data storage unit stores a plurality of pieces of the alpha value data that are associated individually with different areas in the image and that indicate correspondence between the index indicated in the pixel data associated with pixels in the areas and an alpha value, and the alpha value determination unit determines an alpha value of the pixels associated with the pixel data based on the index indicated in the pixel data and the alpha value data associated with the areas including the pixels.

Furthermore, in an aspect of the present invention, the alpha value data storage unit stores the alpha value data referenced in common by the index regarding a plurality of the images.

Alternatively, the alpha value data storage unit stores a plurality of pieces of the alpha value data sequentially applied over time, and the alpha value determination unit determines an alpha value of the pixels associated with the pixel data based on the plurality of pieces of alpha value data such that the value varies over time.

Alternatively, the alpha value data storage unit stores a plurality of pieces of the alpha value data that are used in common to determine alpha values of the single image displayed in succession across a plurality of frames and that are associated with the respective frames, and the alpha value determination unit determines an alpha value of the pixels associated with the pixel data in each of the plurality of frames based on the index indicated in the pixel data and the alpha value data associated with the frame.

In addition, the present invention provides an alpha value determination method including a step of acquiring a plurality of pieces of pixel data indicating a pixel value and an index and associated individually with a plurality of pixels included in an image, from a pixel data storage unit that stores the plurality of pieces of pixel data, a step of acquiring alpha value data that is referenced in common by the index indicated in the plurality of pieces of pixel data and that indicates correspondence between the index and an alpha value, from an alpha value data storage unit that stores the alpha value data, and a step of determining alpha values of a plurality of pixels associated with the respective pieces of pixel data based on the index indicated in the pixel data and the alpha value data.

In addition, the present invention provides a program causing a computer to execute a procedure of acquiring a plurality of pieces of pixel data indicating a pixel value and an index and associated individually with a plurality of pixels included in an image, from a pixel data storage unit that stores the plurality of pieces of pixel data, a procedure of acquiring alpha value data that is referenced in common by the index indicated in the plurality of pieces of pixel data and that indicates correspondence between the index and an alpha value, from an alpha value data storage unit that stores the alpha value data, and a procedure of determining alpha values of a plurality of pixels associated with the respective pieces of pixel data based on the index indicated in the pixel data and the alpha value data.

In addition, the present invention provides a data structure of image data, the data structure including a plurality of pieces of pixel data indicating a pixel value and an index and associated individually with a plurality of pixels included in an image, and alpha value data that is referenced in common by the index indicated in the plurality of pieces of pixel data and that indicates correspondence between the index and an alpha value. Alpha values of a plurality of pixels associated with the respective pieces of pixel data are determined based on the index indicated in the pixel data and the alpha value data.

DESCRIPTION OF EMBODIMENT

Hereinafter, an embodiment of the present invention will be described with reference to the drawings.

Figure 1:
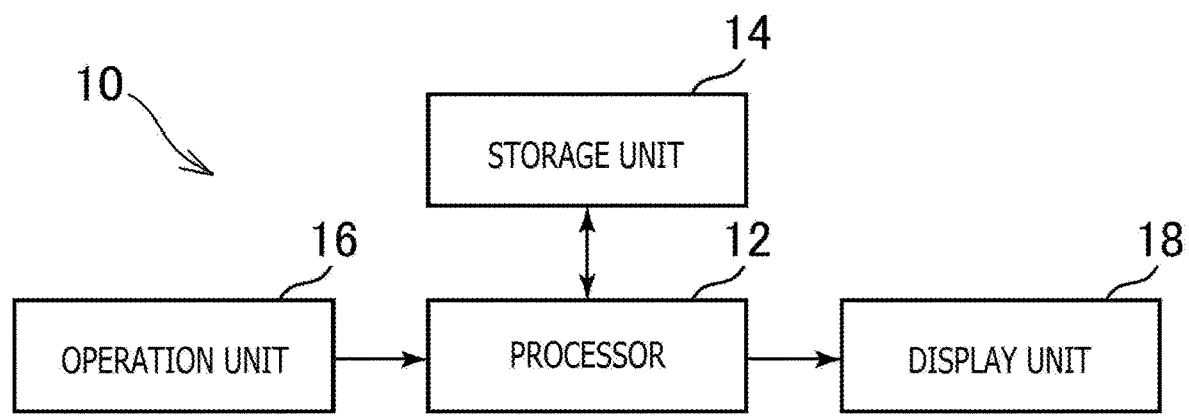
FIG. 1 is a diagram illustrating an example of a configuration of an image processing apparatus according to an embodiment of the present invention.

FIG. 1 is a diagram illustrating an example of a configuration of an image processing apparatus 10 according to an embodiment of the present invention. The image processing apparatus 10 according to the present embodiment is, for example, a game console, a portable game terminal, a personal computer, or the like. As illustrated in FIG. 1, the image processing apparatus 10 according to the present embodiment includes a processor 12, a storage unit 14, an operation unit 16, and a display unit 18.

The processor 12 is a program control device such as a CPU (Central Processing Unit) that operates according to a program installed on the image processing apparatus 10. The processor 12 according to the present embodiment also includes a GPU (Graphics Processing Unit) that draws an image in a frame buffer based on a graphics command or data supplied from the CPU.

The storage unit 14 is a storage element such as a ROM (Read Only Memory) and a RAM (Random Access Memory), a hard disk drive, or the like. In addition, an area of the frame buffer in which an image is to be drawn by the GPU is reserved in the storage unit 14 according to the present embodiment.

The operation unit 16 is a keyboard, a mouse, a controller of a game console, or the like. The operation unit 16 receives an operation input performed by the user and outputs a signal indicating the contents thereof to the processor 12.

The display unit 18 is a display device such as a liquid crystal display, and the display unit 18 displays various images according to instructions of the processor 12.

In the present embodiment, a background image and a foreground image are combined to generate a combined image at, for example, a predetermined rate (for example, every $1/60$ seconds), and such combined images are displayed on the display unit 18. In this way, a moving image including a plurality of combined images is displayed on the display unit 18 in the present embodiment.

In the following description, the number of pixels in a vertical direction and the number of pixels in a horizontal direction of the background image, the foreground image, and the combined image are the same, and the pixels associated with each other in the respective images will be represented by the same coordinate values.

In addition, color information of the pixels included in each of the background image, the foreground image, and the combined image is represented by pixel values in an RGB color system in the present embodiment. Furthermore, pixel values of red components, green components, and blue components in the RGB color system are referred to as R values, G values, and B values, respectively.

In addition, color depth of the image according to the present embodiment is represented by 10 bits corresponding to deep color, HDR, or the like. Therefore, rich image representation can be performed in the present embodiment.

In the present embodiment, the pixel value of each pixel in the combined image is set to a result obtained by combining the pixel value of the pixel in the background image and the pixel value of the pixel in the foreground image, the pixels corresponding to the pixel in the combined image, at transparency according to an alpha value of the pixel of the foreground image.

Figure 2:
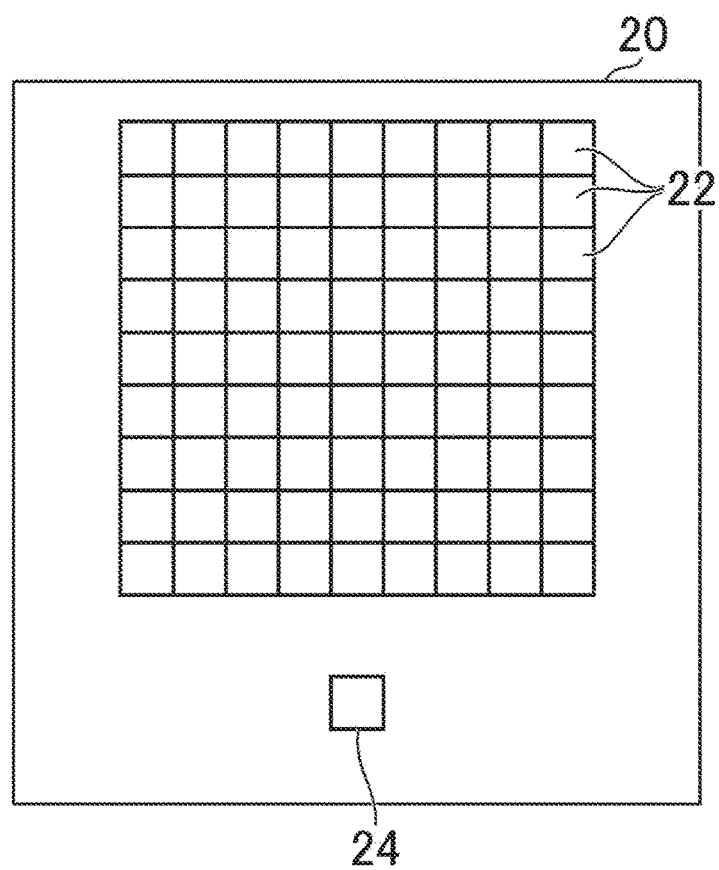
FIG. 2 is a diagram illustrating an example of a data structure of foreground image data.

FIG. 2 is a diagram illustrating an example of a data structure of foreground image data 20 indicating the foreground image according to the present embodiment. As illustrated in FIG. 2, the foreground image data 20 according to the present embodiment includes a plurality of pieces of foreground pixel data 22 associated with the respective pixels, and alpha value data 24. Note that FIG. 2 illustrates an example of the foreground image data 20 in the foreground image including 81 pixels in total, where the number of pixels in the vertical direction is nine and the number of pixels in the horizontal direction is nine. However, the number of pixels included in the foreground image is obviously not limited to 81.

Figure 3:
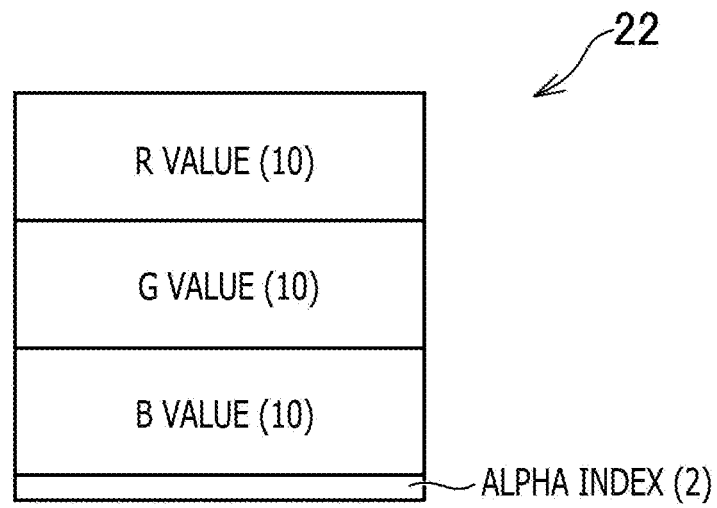
FIG. 3 is a diagram illustrating an example of a data structure of foreground pixel data.

FIG. 3 is a diagram illustrating an example of a data structure of the foreground pixel data 22 according to the present embodiment. In FIG. 3, the number in parentheses indicates the number of bits of each element. As illustrated in FIG. 3, a size of the foreground pixel data 22 according to the present embodiment is 32 bits including an R value of 10 bits, a G value of 10 bits, a B value of 10 bits, and an alpha index of 2 bits.

Figure 4:
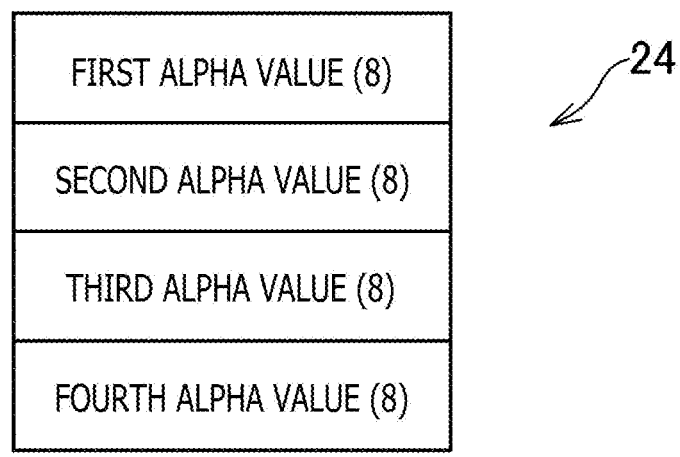
FIG. 4 is a diagram illustrating an example of a data structure of alpha value data.

FIG. 4 is a diagram illustrating an example of a data structure of the alpha value data 24 according to the present embodiment. In FIG. 4, the number in parentheses indicates the number of bits of each element. As illustrated in FIG. 4, a size of the alpha value data 24 according to the present embodiment is 32 bits including a first alpha value, a second alpha value, a third alpha value, and a fourth alpha value that are alpha values of 8 bits each. Note that the alpha value data 24 may include the first to fourth alpha values in a table format.

In the present embodiment, integers equal to or larger than 0 and equal to or smaller than 255 are used to represent the alpha value in 256 gradations. In addition, complete transparency is represented by 0, and complete opaqueness is represented by 255. Note that the representation of the alpha value is not limited to this representation.

Figure 5:
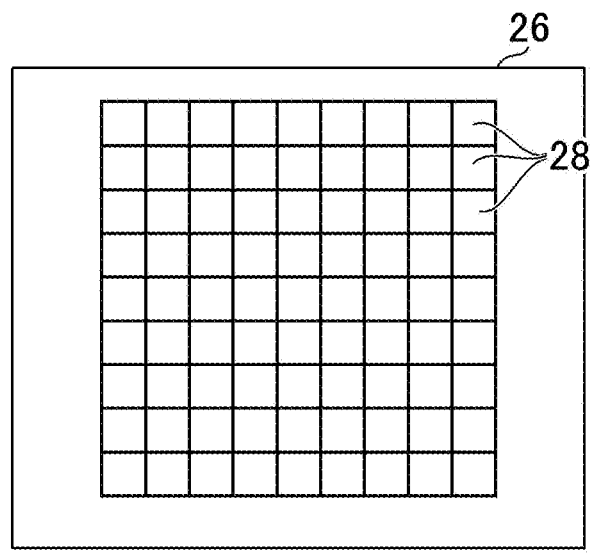
FIG. 5 is a diagram illustrating an example of a data structure of background image data.

FIG. 5 is a diagram illustrating an example of a data structure of background image data 26 indicating the background image according to the present embodiment. As illustrated in FIG. 5, the background image data 26 according to the present embodiment includes a plurality of pieces of background pixel data 28 associated with the respective pixels. Note that FIG. 2 illustrates an example of the background image data 26 in the background image of 81 pixels in total, where the number of pixels in the vertical direction is 9 and the number of pixels in the horizontal direction is 9. However, the number of pixels included in the background image is obviously not limited to 81.

Figure 6:
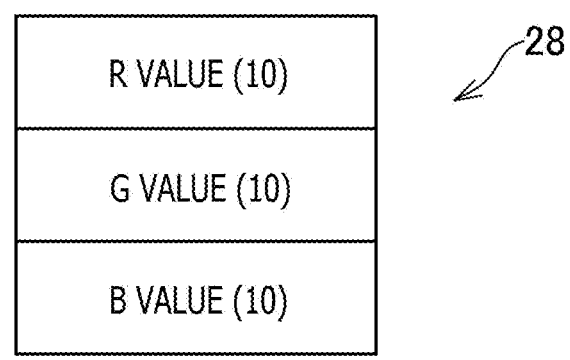
FIG. 6 is a diagram illustrating an example of a data structure of background pixel data.

FIG. 6 is a diagram illustrating an example of a data structure of the background pixel data 28 according to the present embodiment. In FIG. 6, the number in parentheses indicates the number of bits of each element. As illustrated in FIG. 6, a size of the background pixel data 28 according to the present embodiment is 30 bits including an R value of 10 bits, a G value of 10 bits, and a B value of 10 bits.

Note that although the data structure of the background image data 26 and the data structure of the foreground image data 20 are different from each other in the present embodiment, the data structure of the background image data 26 and the data structure of the foreground image data 20 may be the same.

Furthermore, in the present embodiment, the alpha index included in the foreground pixel data 22 references the alpha value corresponding to the alpha index included in the alpha value data 24. Furthermore, the alpha value of the pixel associated with the foreground pixel data 22 is determined based on the referenced alpha value.

For example, in a case where the value of the alpha index included in the foreground pixel data 22 is 0 ("00" in 2-bit representation), the first alpha value may be determined as the alpha value of the pixel associated with the foreground pixel data 22. Similarly, in a case where, for example, the value of the alpha index is 1 ("01" in 2-bit representation), the second alpha value may be determined as the alpha value of the pixel. Similarly, in a case where, for example, the value of the alpha index is 2 ("10" in 2-bit representation), the third alpha value may be determined as the alpha value of the pixel. Similarly, in a case where, for example, the value of the alpha index is 3 ("11" in 2-bit representation), the fourth alpha value may be determined as the alpha value of the pixel.

Furthermore, an alpha blending process of the foreground image and the background image based on the alpha value is executed to generate the combined image. For example, based on the pixel value of a pixel included in the foreground image, the alpha value of the pixel determined as described above, and the pixel value of the pixel included in the background image corresponding to the pixel in the foreground image, the pixel value of the pixel included in the combined image corresponding to the pixel in the foreground image is determined.

For example, it is assumed that the R value of the pixel included in the foreground image is $R1$, the alpha value of the pixel is $A$, and the R value of the pixel in the background image with the same coordinate values as the pixel is $R0$. In this case, a value calculated by a formula $R0\times(1-A/255)+R1\times A/255$ is determined as the R value of the pixel included in the combined image with the same coordinate values as the pixel.

Similarly, it is assumed that the G value of the pixel included in the foreground image is $G1$, and the G value of the pixel in the background image with the same coordinate values as the pixel is $G0$. In this case, a value calculated by a formula $G0\times(1-A/255)+G1\times A/255$ is determined as the G value of the pixel included in the combined image with the same coordinate values as the pixel.

Similarly, it is assumed that the B value of the pixel included in the foreground image is $B1$, and the B value of the pixel in the background image with the same coordinate values as the pixel is $B0$. In this case, a value calculated by a formula $B0\times(1-A/255)+B1\times A/255$ is determined as the B value of the pixel included in the combined image with the same coordinate values as the pixel.

Note that the determination method of the pixel values of the pixels included in the combined image is not limited to this method.

In addition, for example, an intermediate image may be generated based on the foreground image. Here, a value obtained by multiplying the pixel value of the pixel in the foreground image by the alpha value of the pixel may be set as the pixel value of the pixel in the intermediate image corresponding to the pixel in the foreground image.

Furthermore, in a case where, for example, the R value of the pixel included in the intermediate image is $R2$, a value calculated by a formula $R0\times(1-A/255)+R2$ may be determined as the R value of the pixel included in the combined image with the same coordinate values as the pixel. Similarly, in a case where the G value of the pixel included in the intermediate image is $G2$, a value calculated by a formula $G0\times(1-A/255)+G2$ may be determined as the G value of the pixel included in the combined image with the same coordinate values as the pixel. Similarly, in a case where the B value of the pixel included in the intermediate image is $B2$, a value calculated by a formula $B0\times(1-A/255)+B2$ may be determined as the B value of the pixel included in the combined image with the same coordinate values as the pixel.

Furthermore, in the present embodiment, the pixel values determined in this way are set to respective pixels to generate the combined image, and the combined image is displayed on a screen of the display unit 18.

In general, addresses are allocated to the memory in 32 bits. Therefore, to suppress the storage capacity necessary for storing data of images, it is important to suppress the storage capacity allocated to one pixel to equal to or smaller than 32 bits.

Here, assuming that the color depth is represented by 10 bits for each of the three components and the alpha value is represented by 2 bits, an image rich in color can be represented. However, semi-transparency other than opaqueness and complete transparency can be substantially represented in only two stages.

Therefore, in the present embodiment, the alpha value data 24 including four alpha values with 8 bits each is referenced by the alpha index of 2 bits as described above. In addition, the same alpha value is referenced by the alpha index with the same value indicated in a plurality of pixels.

Therefore, according to the present embodiment, appropriate values are set for the first alpha value, the second alpha value, the third alpha value, and the fourth alpha value of the alpha value data 24, and the image representation becomes rich not only in color but also in transparency. In addition, the storage capacity necessary for storing data of images can be suppressed in the present embodiment compared to the case of allocating the alpha value of 8 bits to each pixel.

Note that the color depth of the image may be represented by 9 bits for each of the three components, and the alpha index may be represented by 5 bits. In this case, 32 types of alpha values can be set in the alpha value data 24. In this way, although the expressiveness of color is lower than in the example described above, the variation of transparency that can be applied to one image can be increased.

Figure 7:
FIG. 7 is a diagram illustrating another example of the data structure of the alpha value data.

Furthermore, in the present embodiment, the alpha value data 24 may include first to fourth R alpha values, first to fourth G alpha values, and first to fourth B alpha values of 8 bits each as illustrated in FIG. 7. In this case, the size of the alpha value data 24 is 96 bits.

Furthermore, the alpha value to be referenced may vary in each component of the pixel value. For example, it is assumed that the value of the alpha index included in the foreground pixel data 22 associated with the pixel included in the foreground image is 0 ("00" in 2-bit representation). In this case, the first R alpha value, the first G alpha value, and the first B alpha value may be determined as the R alpha value, the G alpha value, and the B alpha value of the pixel, respectively. Similarly, in the case where the value of the alpha index is 1 ("01" in 2-bit representation), the second R alpha value, the second G alpha value, and the second B alpha value may be determined as the R alpha value, the G alpha value, and the B alpha value of the pixel, respectively. Furthermore, in the case where the value of the alpha index is 2 ("10" in 2-bit representation), the third R alpha value, the third G alpha value, and the third B alpha value may be determined as the R alpha value, the G alpha value, and the B alpha value of the pixel, respectively. Furthermore, similarly, in the case where the value of the alpha index is 3 ("11" in 2-bit representation), the fourth R alpha value, the fourth G alpha value, and the fourth B alpha value may be determined as the R alpha value, the G alpha value, and the B alpha value of the pixel, respectively.

Here, for example, it is assumed that the R value of the pixel included in the foreground image is R1, the R alpha value of the pixel is AR, and the R value of the pixel in the background image with the same coordinate values as the pixel is R0. In this case, a value calculated by a formula R0×(1−AR/255)+R1×AR/255 is determined as the R value of the pixel included in the combined image with the same coordinate values as the pixel.

Similarly, it is assumed that the G value of the pixel included in the foreground image is G1, the G alpha value of the pixel is AG, and the G value of the pixel in the background image with the same coordinate values as the pixel is G0. In this case, a value calculated by a formula G0×(1−AG/255)+G1×AG/255 is determined as the G value of the pixel included in the combined image with the same coordinate values as the pixel.

Similarly, it is assumed that the B value of the pixel included in the foreground image is B1, the B alpha value of the pixel is AB, and the B value of the pixel in the background image with the same coordinate values as the pixel is B0. In this case, a value calculated by a formula B0×(1−AB/255)+B1×AB/255 is determined as the B value of the pixel included in the combined image with the same coordinate values as the pixel.

In the example described with reference to FIGS. 2 to 6, a common alpha value (A described above) is applied to each of the R value, the G value, and the B value. On the other hand, in the example described with reference to FIG. 7, one alpha index is used to refer to a plurality of difference alpha values for the R value, the G value, and the B value. Therefore, different transparency can be set for each component in this way, and an image richer in transparency can be represented. Furthermore, although the size of the alpha value data 24 increases in this case, the size of the alpha index is 2 bits. Therefore, the storage capacity necessary for storing image data can also be suppressed in this case.

Figure 8:
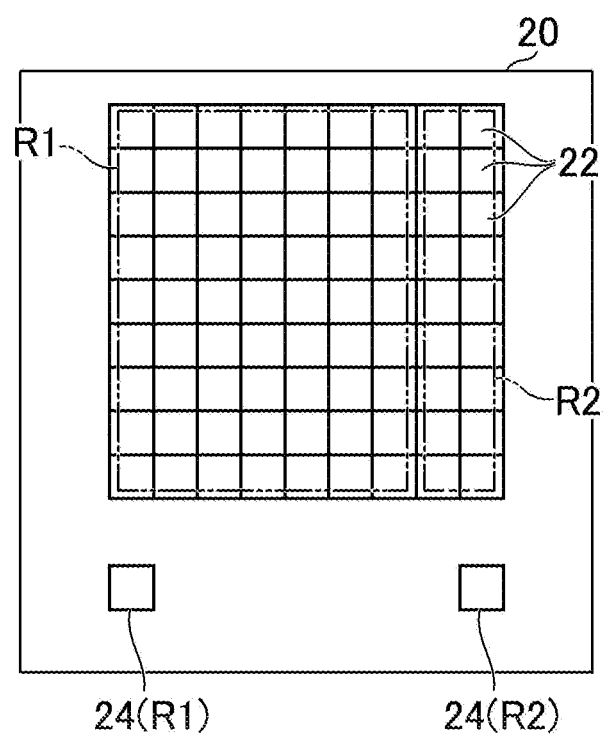
FIG. 8 is a diagram illustrating another example of the data structure of the foreground image data.

Furthermore, as illustrated in FIG. 8, the foreground image data 20 may include a plurality of pieces of alpha value data 24 associated individually with different areas in the foreground image. In the example of FIG. 8, alpha value data 24 (R1) is referenced from the alpha index of the pixel in an area R1, and alpha value data 24 (R2) is referenced from the alpha index of the pixel in an area R2, for example. Here, the foreground image data 20 may include, for example, pixel area corresponding data indicating the area to which each pixel belongs. In addition, the alpha value data 24 (one of the alpha value data 24 (R1) and the alpha value data 24 (R2)) referenced by the alpha index included in the foreground pixel data 22 may be determined based on the pixel area corresponding data.

In this way, for example, a combination of different alpha values can be applied to a plurality of areas in one image. For example, an image may include a game area indicating the situation of game play and a UI area indicating the user interface. In the case where a plurality of areas for different uses or purposes are included in the displayed image in this way, it may be desirable to apply a combination of different alpha values to the plurality of areas. The data structure of the foreground image data 20 illustrated in FIG. 8 is particularly suitable for such a case.

Note that although the foreground image includes two areas in the description above, the foreground image may include three or more areas. In this case, the number of pieces of alpha value data 24 included in the foreground image data 20 corresponds to the number of areas.

Figure 9:
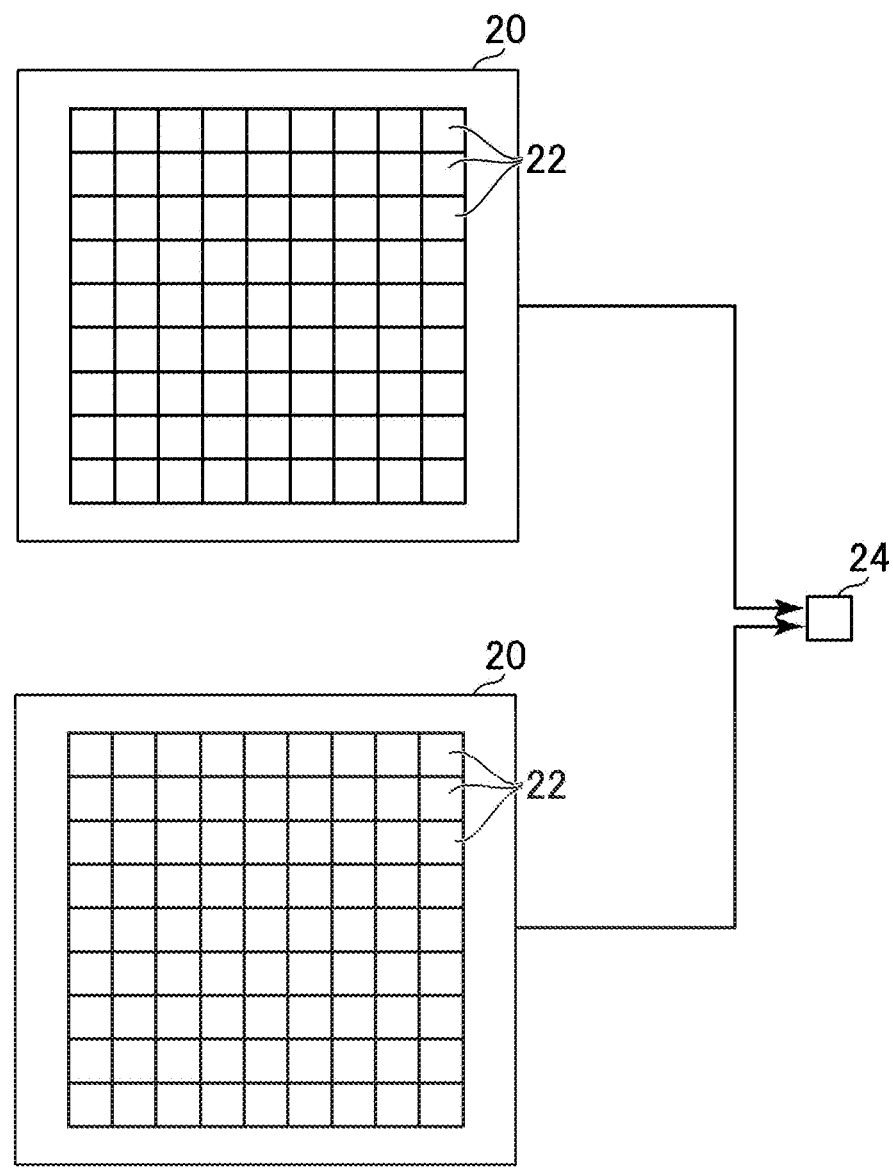
FIG. 9 is a diagram illustrating another example of the data structure of the foreground image data and the alpha value data.

In addition, as illustrated in FIG. 9, the foreground image data 20 may not include the alpha value data 24, and one piece of alpha value data 24 may be referenced from a plurality of pieces of foreground image data 20. In this case, the alpha index of the foreground pixel data 22 included in each of the plurality of pieces of foreground image data 20 refers to the common alpha value data 24. Therefore, a combination of a plurality of alpha values set in the common alpha value data 24 is applied in common to each of the plurality of pieces of foreground image data 20.

Unlike in the example of FIG. 2 in which the foreground pixel data 22 is associated with the alpha value data 24 for each piece of foreground image data 20, a plurality of pieces of foreground image data 20 is associated with one piece of alpha value data 24 in the example of FIG. 9. Therefore, the storage capacity necessary for storing the alpha value data 24 can be further suppressed in the example of FIG. 9. The data structure of the foreground image data 20 illustrated in FIG. 9 is suitable for, for example, applying a combination of specific alpha values in common to a plurality of frame images included in a moving image.

Figure 10:
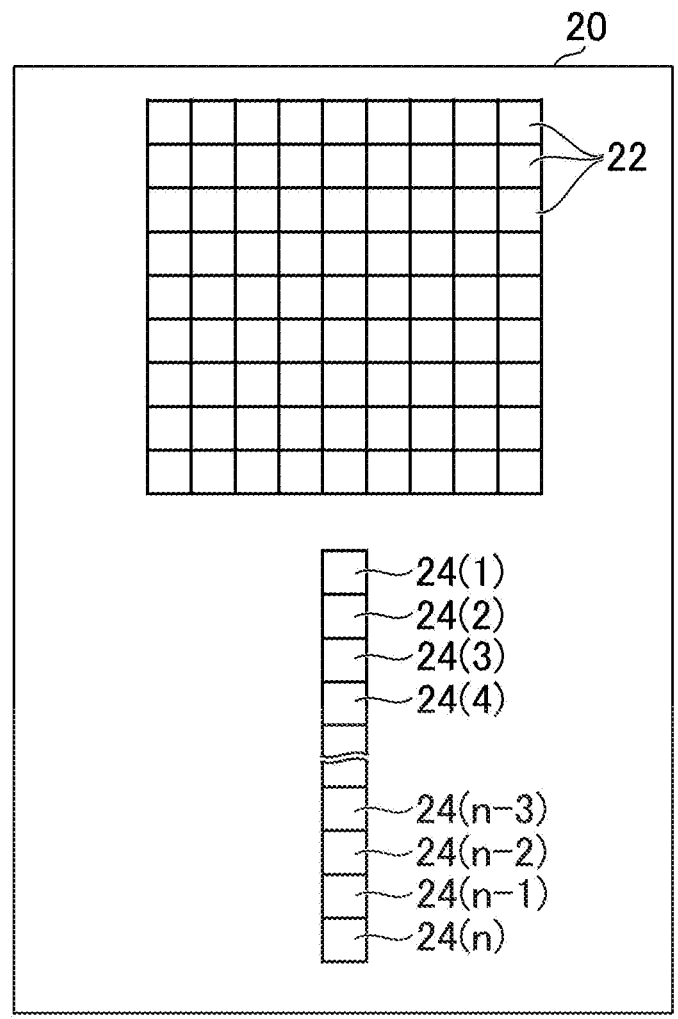
FIG. 10 is a diagram illustrating yet another example of the data structure of the foreground image data.

Furthermore, as illustrated in FIG. 10, the foreground image data 20 associated with one foreground image may include a plurality of pieces of alpha value data 24 sequentially applied over time. Here, each of the plurality of pieces of alpha value data 24 may be associated with identification information of a frame such as a frame number. FIG. 10 illustrates an example of a case in which the number of frames is n, and data from alpha value data 24(1) to alpha value data 24(n) is illustrated as the alpha value data 24. In the example of FIG. 10, the frame numbers are indicated by the numbers in parentheses.

Here, for example, based on a plurality of pieces of alpha value data, the alpha value of the pixel associated with the foreground pixel data 22 may be determined such that the value varies over time. For example, in each of a plurality of frames, the alpha value data 24 associated with the frame number of the frame may be referenced by the alpha index. In this way, for example, in generating a combined image of each frame, image representation such as fade-in and fade-out can be performed in which the transparency changes over time while the base foreground image is in common.

Also in the examples described with reference to FIGS. 8 to 10, the data structure of the alpha value data 24 may be, for example, the data structure illustrated in FIG. 4 or the data structure illustrated in FIG. 7.

In addition, the examples described with reference to FIGS. 8 to 10 may be combined. For example, the alpha value data 24 may be associated with, for example, combinations of the frame numbers and the areas to which the pixels belong. Furthermore, based on the combination of the frame number and the area to which the pixel belongs, the alpha value data 24 to be referenced by the alpha index of the pixel may be determined.

In addition, the alpha value data 24 may not include the alpha value itself. For example, the alpha value data 24 may include data indicating a calculation rule such as a formula, a function, and a program for calculating the alpha value based on the alpha index. Furthermore, a value calculated based on the value of the alpha index associated with the pixel and the calculation rule such as a formula, a function, and a program referenced by the alpha index may be determined as the alpha value of the pixel.

Furthermore, for example, in the example described with reference to FIG. 10, the alpha value data 24 may include data indicating a calculation rule such as a formula, a function, and a program for calculating the alpha value based on the alpha index and the frame number. For example, the alpha value data 24 may indicate the alpha values of the first frame and the last frame, an amount of change in the alpha value per frame, or the like.

In addition, the alpha value determined may be converted according to, for example, a scene in which the combined image is displayed. In addition, for example, parameters in the calculation rule indicated by the alpha value data 24 may be changed according to, for example, the scene in which the combined image is displayed.

Settings of the values for the foreground image data 20 and the background image data 26 in the present embodiment may be input by, for example, an operator such as a designer through a design tool or the like.

Hereinafter, functions of the image processing apparatus 10 according to the present embodiment and processes executed by the image processing apparatus 10 according to the present embodiment will be further described.

Figure 11:
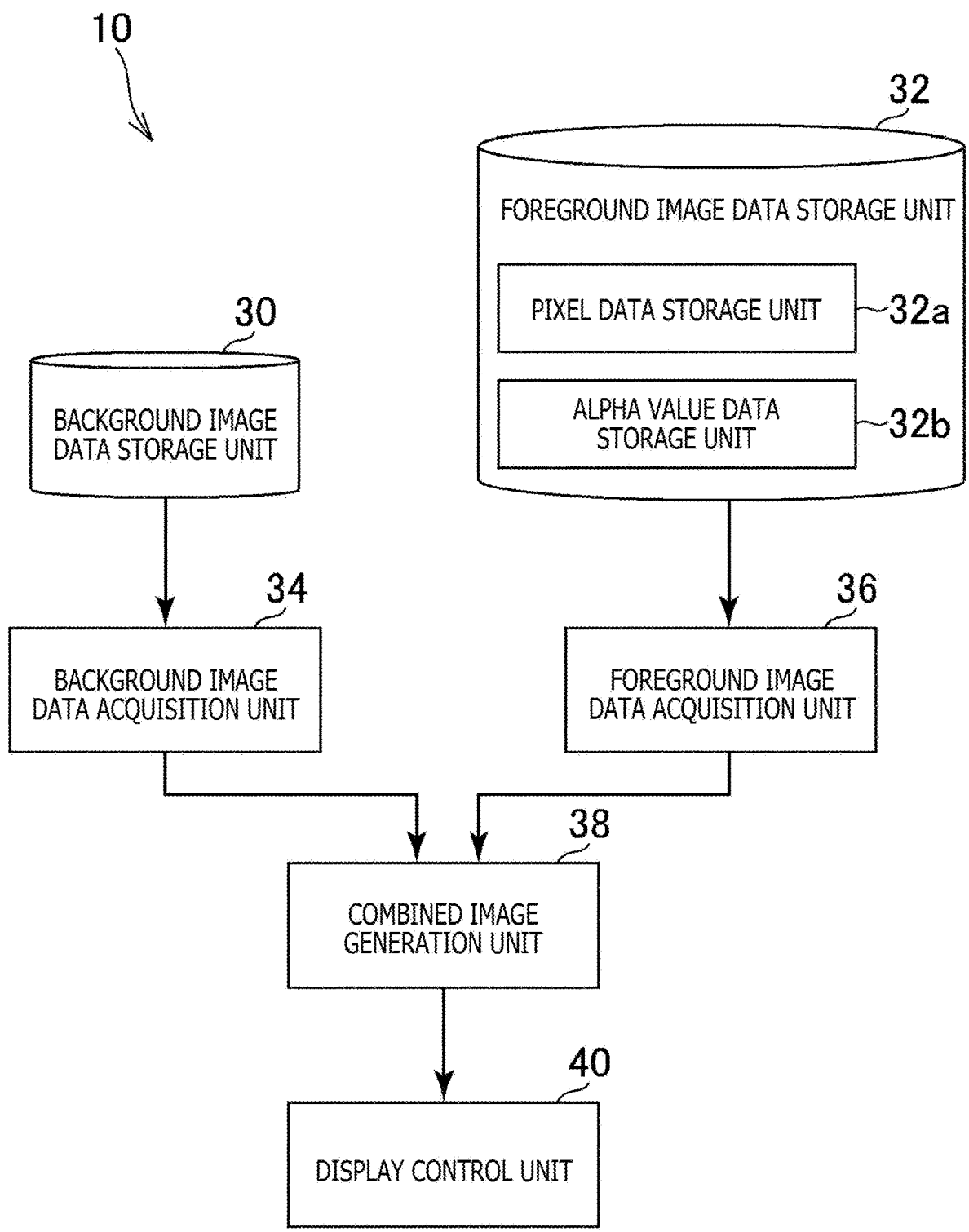
FIG. 11 is a functional block diagram illustrating an example of functions of the image processing apparatus according to the embodiment of the present invention.

FIG. 11 is a functional block diagram illustrating an example of the functions implemented in the image processing apparatus 10 according to the present embodiment. Note that not all of the functions illustrated in FIG. 11 need to be implemented in the image processing apparatus 10 according to the present embodiment, and functions other than the functions illustrated in FIG. 11 may be implemented.

As illustrated in FIG. 11, the functions of the image processing apparatus 10 include, for example, a background image data storage unit 30, a foreground image data storage unit 32, a background image data acquisition unit 34, a foreground image data acquisition unit 36, a combined image generation unit 38, and a display control unit 40. In addition, the foreground image data storage unit 32 includes a pixel data storage unit 32a and an alpha value data storage unit 32b. The master of the background image data storage unit 30 and the foreground image data storage unit 32 is the storage unit 14. The master of the background image data acquisition unit 34, the foreground image data acquisition unit 36, and the combined image generation unit 38 is the processor 12. The masters of the display control unit 40 are the processor 12 and the display unit 18.

The functions may be implemented by the processor 12 executing a program that is installed on the image processing apparatus 10 as a computer and that includes commands corresponding to the functions. The program may be supplied to the image processing apparatus 10 through, for example, a computer-readable information storage medium such as an optical disk, a magnetic disk, a magnetic tape, a magneto-optical disk, and a flash memory, or through the Internet or the like.

The background image data storage unit 30 stores, for example, the background image data 26 in the present embodiment.

The foreground image data storage unit 32 stores, for example, the foreground image data 20 in the present embodiment.

The pixel data storage unit 32a stores, for example, the plurality of pieces of foreground pixel data 22 in the present embodiment. As described above, the plurality of pieces of foreground pixel data 22 are associated with the respective pixels included in the foreground image. In addition, the foreground pixel data 22 indicates the pixel value and the index (alpha index).

Here, as described above, the foreground pixel data 22 may indicate the pixel values of a plurality of components (for example, three components). Note that the plurality of components are not limited to the R value, the G value, and the B value. For example, in the representation in the HLS system, the plurality of components include an H value indicating the hue, an S value indicating the saturation, and an L value indicating the luminance.

Here, as described above, the number of bits of the alpha index indicated in the foreground pixel data 22 may be smaller than that of the pixel value of one component indicated in the foreground pixel data 22. For example, the number of bits of the alpha index indicated in the foreground pixel data 22 may be smaller than any of the number of bits of the R value, the number of bits of the G value, and the number of bits of the B value indicated in the foreground pixel data 22.

The alpha value data storage unit 32b stores, for example, the alpha value data 24 in the present embodiment. As described above, the alpha value data 24 indicates the correspondence between the alpha index and the alpha value referenced in common by the alpha index indicated in the plurality of pieces of foreground pixel data 22. Here, as described above, the alpha value data 24 may include the alpha value itself or may include the formula, the function, the program, or the like indicating the calculation rule for calculating the alpha value.

The background image data acquisition unit 34 acquires, for example, the background image data 26 stored in the background image data storage unit 30 in the present embodiment.

The foreground image data acquisition unit 36 acquires, for example, the foreground image data 20 stored in the foreground image data storage unit 32 in the present embodiment.

The combined image generation unit 38 generates, for example, a combined image obtained by combining the background image indicated in the background image data 26 acquired by the background image data acquisition unit 34 and the foreground image indicated in the foreground image data 20 acquired by the foreground image data acquisition unit 36 in the present embodiment.

For example, the combined image generation unit 38 determines the alpha values of the plurality of pixels associated individually with the plurality of pieces of foreground pixel data 22 based on the alpha index indicated in the foreground pixel data 22 and the alpha value data 24. Here, for example, the alpha value referenced by the alpha index indicated in the foreground pixel data 22 may be determined as the alpha value of the pixel associated with the foreground pixel data 22.

Furthermore, the combined image generation unit 38 executes, for example, an alpha blending process of the foreground image and the background image based on the alpha value determined as described above to generate the combined image. Based on, for example, the pixel value of the pixel included in the foreground image, the alpha value of the pixel, and the pixel value of the pixel included in the background image corresponding to the pixel in the foreground image, the combined image generation unit 38 determines the pixel value of the pixel included in the combined image corresponding to the pixel in the foreground image. Furthermore, the combined image generation unit 38 generates the combined image in which the pixel values determined in this way are set in the respective pixels.

The display control unit 40 causes, for example, the screen to display the combined image generated by the combined image generation unit 38 in the present embodiment. Here, as described above, each pixel included in the foreground image is displayed in the color indicated by the pixel value of the pixel indicated in the foreground pixel data 22 and with the transparency according to the alpha value of the pixel determined as described above.

In addition, as described above, the foreground image data storage unit 32 may store a plurality of pieces of foreground image data 20 including the plurality of pieces of foreground pixel data 22 associated with one background image and the alpha value data 24 associated with the one background image. In this case, the plurality of pieces of foreground pixel data 22 associated with one background image and the alpha value data 24 associated with the one background image are associated with each other. Furthermore, in this case, the combined image generation unit 38 may determine the alpha values of a plurality of pixels included in one background image based on the alpha value data 24 associated with the background image.

In addition, as described with reference to FIG. 7, the alpha value data storage unit 32b may store the alpha value data 24 indicating the correspondence between the alpha index and the plurality of alpha values associated individually with the plurality of components of the pixel. Furthermore, in this case, the combined image generation unit 38 may determine the alpha value of each of the plurality of components of the pixel associated with the foreground pixel data 22 based on the alpha index indicated in the foreground pixel data 22 and the alpha value data 24.

In addition, as described with reference to FIG. 8, the alpha value data storage unit 32b may store the plurality of pieces of alpha value data 24 associated with respective different areas in the foreground image. In this case, one piece of alpha value data 24 indicates the correspondence between the alpha index and the alpha value indicated in the foreground pixel data 22 associated with the pixel in the area associated with the alpha value data 24. Furthermore, in this case, the combined image generation unit 38 may determine the alpha value of the pixel associated with the foreground pixel data 22 based on the alpha index indicated in the foreground pixel data 22 and the alpha value data 24 associated with the area including the pixel.

In addition, as described with reference to FIG. 9, the alpha value data storage unit 32b may store the alpha value data 24 referenced in common by the alpha index for a plurality of foreground images.

In addition, the alpha value data storage unit 32b may store, for example, a plurality of pieces of alpha value data sequentially applied over time. Furthermore, in this case, the combined image generation unit 38 may determine the alpha value of the pixel associated with the foreground pixel data 22 based on the plurality of pieces of alpha value data such that the value varies over time.

Here, for example, as described with reference to FIG. 10, the alpha value data storage unit 32b may store the plurality of pieces of alpha value data 24 that are used in common to determine the alpha values of one image displayed in succession across a plurality of frames and that are associated with the respective frames. Furthermore, in this case, the combined image generation unit 38 may determine the alpha value of the pixel associated with the foreground pixel data 22 in each of the plurality of frames. Furthermore, in this case, the combined image generation unit 38 may determine the alpha value of the pixel associated with the foreground pixel data 22 based on the alpha index indicated in the foreground pixel data 22 and the alpha value data 24 associated with the frame.

Figure 12:
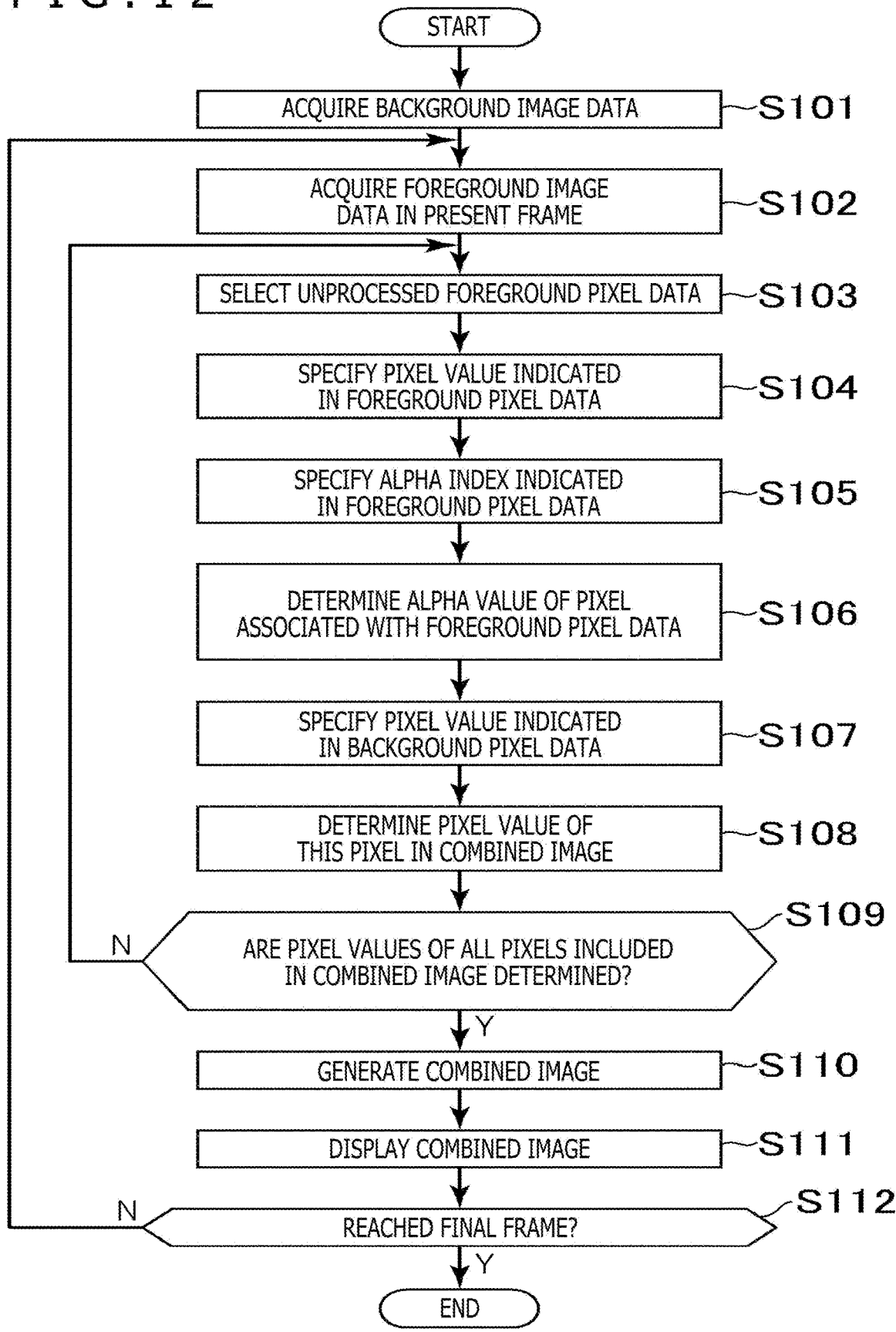
FIG. 12 is a flow chart illustrating an example of a flow of a process executed by the image processing apparatus according to the embodiment of the present invention.

Here, an example of a flow of the process executed by the image processing apparatus 10 according to the present embodiment will be described with reference to a flow chart illustrated in FIG. 12. In the process illustrated in the present processing example, the combined images are generated and displayed across a plurality of frames.

First, the background image data acquisition unit 34 acquires the background image data 26 stored in the background image data storage unit 30 (S101).

Furthermore, the foreground image data acquisition unit 36 acquires the foreground image data 20 in the present frame stored in the foreground image data storage unit 32 (S102).

Furthermore, the combined image generation unit 38 selects one piece of foreground pixel data 22 not subjected to the process illustrated in S104 to S108 yet from among the plurality of pieces of foreground pixel data 22 included in the foreground image data 20 acquired in the process illustrated in S102 (S103).

Furthermore, the combined image generation unit 38 specifies the pixel value indicated in the foreground pixel data 22 selected in the process illustrated in S103 (S104).

Furthermore, the combined image generation unit 38 specifies the alpha index indicated in the foreground pixel data 22 selected in the process illustrated in S103 (S105).

Furthermore, the combined image generation unit 38 determines the alpha value of the pixel associated with the foreground pixel data 22 selected in the process illustrated in S103 based on the alpha index specified in the process illustrated in S105 (S106). Here, for example, the alpha value included in the alpha value data 24 referenced by the alpha index may be determined as the alpha value of the pixel associated with the foreground pixel data 22 selected in the process illustrated in S103. In addition, for example, the alpha value of the pixel associated with the foreground pixel data 22 selected in the process illustrated in S103 may be determined based on the alpha index and the calculation rule indicated in the alpha value data 24 referenced by the alpha index.

Furthermore, the combined image generation unit 38 specifies the pixel value indicated in the background pixel data 28 of the pixel with the same coordinate values as the pixel associated with the foreground pixel data 22 selected in the process illustrated in S103 included in the background image data 26 acquired in the process illustrated in S101 (S107).

Furthermore, the combined image generation unit 38 determines, in the combined image, the pixel value of the pixel with the same coordinate values as the pixel associated with the foreground pixel data 22 selected in the process illustrated in S103 (S108). Here, the pixel value of the pixel in the combined image is determined based on, for example, the pixel values specified in the process illustrated in S104 and S107 and the alpha value specified in the process illustrated in S106.

Furthermore, the combined image generation unit 38 checks whether or not the pixel values of all of the pixels included in the combined image in the present frame are determined (S109).

If the pixel values of all of the pixels included in the combined image in the present frame are not determined (S109: N), the process returns to the process illustrated in S103.

If the pixel values of all of the pixels included in the combined image in the present frame are determined (S109: Y), the combined image generation unit 38 generates the combined image based on the pixel value determined in the process illustrated in S108 (S110).

Furthermore, the display control unit 40 causes the screen of the display unit 18 to display the combined image generated in the process illustrated in S110 (S111).

Furthermore, the combined image generation unit 38 checks whether or not the process has reached the final frame (S112). If the process has not reached the final frame (S112: N), the process returns to the process illustrated in S102. If the process has reached the final frame (S112: Y), the process illustrated in the present processing example ends.

Note that, for example, in the process illustrated in S102, the combined image generation unit 38 may determine the alpha value in the present frame based on the calculation rule indicated in the alpha value data 24 included in the foreground image data 20 after the foreground image data 20 is acquired. Here, for example, a plurality of alpha values in the present frame associated with respective alpha indices may be determined. Furthermore, in the process illustrated in S106, the alpha value determined in this way associated with the alpha index specified in the process illustrated in S105 may be determined as the alpha value of the pixel associated with the foreground pixel data 22 selected in the process illustrated in S103.

In addition, although the processing example is based on the assumption that the background image is the same in all of the frames, the background image may vary in each frame. In this case, the background image data 26 in the present frame is acquired in the process illustrated in S101. In addition, if it is determined that the process has not reached the final frame in the process illustrated in S112 (S112: N), the process returns to the process illustrated in S101.

Note that the present invention is not limited to the embodiment.

For example, the present invention can be applied not only to the combining of two images as described above, but also to the combining of three or more images.

In addition, the specific character strings and numerical values described above and the specific character strings and numerical values in the drawings are examples, and the character strings and the numerical values are not limited to these.

The invention claimed is:

1. An alpha value determination apparatus comprising:
    a pixel data storage unit that stores a plurality of pieces of pixel data of a foreground image, each piece of pixel data corresponding to a single, respective pixel of the foreground image, each piece of pixel data including:
    (i) a respective group of bytes of data stored in relationship to one another in a data structure,
    (ii) a plurality of bytes of color data establishing a respective pixel value that sets a respective color of the respective pixel of the foreground image, where the plurality of bytes of color data for each such respective pixel value having at least one byte of R value data, at least one byte of G value data, and at least one byte of B value data, and
    (iii) one byte of a respective index among a plurality of indices, to an alpha value table;
    an alpha value data storage unit that stores alpha value data in a plurality of entries in the alpha value table, where each entry of the plurality of entries is referenced by one or more of the plurality of indices, and each entry contains a respective alpha value among a plurality of alpha values; and
    an alpha value determination unit that determines one or more of the plurality of alpha values for each one of the respective pieces of pixel data based on the respective index indicated in such respective pixel data, where the respective index is used to reference the one or more alpha values in the alpha value table,
    wherein each background pixel of a background image and each corresponding one of the plurality of pixels of the image, as a foreground image, are combined to form a respective combined pixel for a combined image that blends the foreground and background images, the respective combined pixel having a transparency set according to the one or more alpha values referenced by the respective index indicated in the pixel data for the corresponding one of the plurality of pixels of the foreground image.

2. The alpha value determination apparatus according to claim 1, wherein a number of bits of the byte of the respective index indicated in the pixel data is smaller than a number of bits of each of the plurality of bytes of color data.

3. The alpha value determination apparatus according to claim 1, wherein:
  each index among the plurality of indices references a plurality of the entries of the alpha value table, such that each index references a respective set of the alpha values, where each of the alpha values is the respective set of alpha values corresponds with a respective one of the plurality of bytes of color data, and each of the plurality of bytes of color data correspond to a respective one of a plurality of color components of a respective one of the plurality of pixels of the image, and
  the alpha value determination unit determines respective alpha value for each of the plurality of color components of a given one of the plurality of pixels by referencing the respective set of the alpha values in the alpha value table corresponding to the respective index contained in the piece of pixel data for such given one of the plurality of pixels.

4. The alpha value determination apparatus according to claim 3, wherein
  the alpha value data storage unit stores the respective sets of alpha values in accordance with different areas in the image and that indicate correspondence between the index indicated in the pixel data associated with pixels in the different areas, and
  the alpha value determination unit determines an alpha value of the pixels associated with the pixel data based on the index indicated in the pixel data and the alpha value data associated with the areas including the pixels.

5. The alpha value determination apparatus according to claim 1, wherein the alpha value data storage unit stores the alpha value data referenced in common by the index regarding a plurality of the images.

6. The alpha value determination apparatus according to claim 1, wherein
  the alpha value data storage unit stores a plurality of pieces of the alpha value data sequentially applied over time, and
  the alpha value determination unit determines an alpha value of the pixels associated with the pixel data based on the plurality of pieces of alpha value data such that the value varies over time.

7. The alpha value determination apparatus according to claim 1, wherein
  the alpha value data storage unit stores a plurality of pieces of the alpha value data that are used in common to determine alpha values of the single image displayed in succession across a plurality of frames and that are associated with the respective frames, and
  the alpha value determination unit determines an alpha value of the pixels associated with the pixel data in each of the plurality of frames based on the index indicated in the pixel data and the alpha value data associated with the frame.

8. The alpha value determination apparatus according to claim 1, wherein the background pixel, foreground pixel, and combined pixel are associated with each other and represented by the same coordinate value.

9. The alpha value determination apparatus according to claim 1, wherein a data size of the foreground pixel is 32 bits including an R value of 10 bits, a G value of 10 bits, a B value of 10 bits, and an alpha index of 2 bits.

10. The alpha value determination apparatus according to claim 9, wherein a data size of the background pixel is 30 bits including an R value of 10 bits, a G value of 10 bits, and a B value of 10 bits.

11. The alpha value determination apparatus according to claim 10, wherein an R value of the combined pixel is calculated by a formula $R0 \times (1-A/255) + R1 \times A/255$, where R1 is an R value of the foreground pixel, R0 is an R value of the background pixel and A is the alpha value of the foreground pixel.

12. An alpha value determination method comprising:
  acquiring a plurality of pieces of pixel data of a foreground image, each piece of pixel data corresponding to a single, respective pixel of the foreground image, each piece of pixel data including:
  (i) a respective group of bytes of data stored in relationship to one another in a data structure,
  (ii) a plurality of bytes of color data establishing a respective pixel value that sets a respective color of the respective pixel of the foreground image, where the plurality of bytes of color data for each such respective pixel value having at least one byte of R value data, at least one byte of G value data, and at least one byte of B value data, and
  (iii) one byte of a respective index among a plurality of indices, to an alpha value table;
  acquiring alpha value data in a plurality of entries in the alpha value table, where each entry of the plurality of entries is referenced by one or more of the plurality of indices, and each entry contains a respective alpha value among a plurality of alpha values; and
  determining one or more of the plurality of alpha values for each one of the respective pieces of pixel data based on the respective index indicated in such respective pixel data, where the respective index is used to reference the one or more alpha values in the alpha value table,
  wherein each background pixel of a background image and each corresponding one of the plurality of pixels of the image, as a foreground image, are combined to form a respective combined pixel for a combined image that blends the foreground and background images, the respective combined pixel having a transparency set according to the one or more alpha values referenced by the respective index indicated in the pixel data for the corresponding one of the plurality of pixels of the foreground image.

13. A non-transitory, computer readable storage medium containing a computer program, which when executed by a computer, causes the computer to perform an alpha value determination method by carrying out actions, comprising:
  acquiring a plurality of pieces of pixel data of a foreground image, each piece of pixel data corresponding to a single, respective pixel of the foreground image, each piece of pixel data including:
  (i) a respective group of bytes of data stored in relationship to one another in a data structure,
  (ii) a plurality of bytes of color data establishing a respective pixel value that sets a respective color of the respective pixel of the foreground image, where the plurality of bytes of color data for each such respective pixel value having at least one byte of R value data, at least one byte of G value data, and at least one byte of B value data, and
  (iii) one byte of a respective index among a plurality of indices, to an alpha value table;
  acquiring alpha value data in a plurality of entries in the alpha value table, where each entry of the plurality of entries is referenced by one or more of the plurality of indices, and each entry contains a respective alpha value among a plurality of alpha values; and determining one or more of the plurality of alpha values for each one of the respective pieces of pixel data based on the respective index indicated in such respective pixel data, where the respective index is used to reference the one or more alpha values in the alpha value table, wherein each background pixel of a background image and each corresponding one of the plurality of pixels of the image, as a foreground image, are combined to form a respective combined pixel for a combined image that blends the foreground and background images, the respective combined pixel having a transparency set according to the one or more alpha values referenced by the respective index indicated in the pixel data for the corresponding one of the plurality of pixels of the foreground image.

14. A non-transitory, computer readable storage medium containing a data structure of image data, the data structure comprising:

a plurality of pieces of pixel data of a foreground image, each piece of pixel data corresponding to a single, respective pixel of the foreground image, each piece of pixel data including:

(i) a respective group of bytes of data stored in relationship to one another in a data structure, (ii) a plurality of bytes of color data establishing a respective pixel value that sets a respective color of the respective pixel of the foreground image, where the plurality of bytes of color data for each such respective pixel value having at least one byte of R value data, at least one byte of G value data, and at least one byte of B value data, and (iii) one byte of a respective index among a plurality of indices, to an alpha value table; and alpha value data in a plurality of entries in the alpha value table, where each entry of the plurality of entries is referenced by one or more of the plurality of indices, and each entry contains a respective alpha value among a plurality of alpha values, wherein one or more of the plurality of alpha values for each one of the respective pieces of pixel data based on the respective index indicated in such respective pixel data, where the respective index is used to reference the one or more alpha values in the alpha value table, wherein each background pixel of a background image and each corresponding one of the plurality of pixels of the image, as a foreground image, are combined to form a respective combined pixel for a combined image that blends the foreground and background images, the respective combined pixel having a transparency set according to the one or more alpha values referenced by the respective index indicated in the pixel data for the corresponding one of the plurality of pixels of the foreground image.

* * * * *